United States Patent
Francini et al.

(10) Patent No.: US 8,160,353 B2
(45) Date of Patent: *Apr. 17, 2012

(54) METHOD FOR DETERMINING DENSE DISPARITY FIELDS IN STEREO VISION

(75) Inventors: Gianluca Francini, Turin (IT); Giovanni Cordara, Turin (IT); Skjalg Lepsoy, Turin (IT)

(73) Assignee: Telecom Italia S.p.A., Milan (IT)

( * ) Notice: Subject to any disclaimer, the term of this patent is extended or adjusted under 35 U.S.C. 154(b) by 798 days.

This patent is subject to a terminal disclaimer.

(21) Appl. No.: 12/085,854

(22) PCT Filed: Dec. 21, 2005

(86) PCT No.: PCT/IB2005/003840
§ 371 (c)(1),
(2), (4) Date: Jun. 17, 2008

(87) PCT Pub. No.: WO2007/072102
PCT Pub. Date: Jun. 28, 2007

(65) Prior Publication Data
US 2010/0215248 A1    Aug. 26, 2010

(51) Int. Cl.
*G06K 9/00* (2006.01)
(52) U.S. Cl. .......................... 382/154; 348/46
(58) Field of Classification Search .................. None
See application file for complete search history.

(56) References Cited

U.S. PATENT DOCUMENTS

| | | | |
|---|---|---|---|
| 5,727,078 A * | 3/1998 | Chupeau | 382/154 |
| 5,764,871 A | 6/1998 | Fogel | |
| 6,046,763 A * | 4/2000 | Roy | 348/47 |
| 2002/0012459 A1* | 1/2002 | Oh | 382/154 |
| 2003/0086590 A1 | 5/2003 | Trajkovic | |

FOREIGN PATENT DOCUMENTS

| JP | 2005-140623 A * | 6/2005 |
|---|---|---|
| WO | WO 2007/036759 A1 | 4/2007 |
| WO | WO 2007/063352 A1 | 6/2007 |

OTHER PUBLICATIONS

Steinbach et al. (Sep. 2000) "An image-domain cost function for 3-D rigid body motion estimation." Proc. 15th Int'l Conf. on Pattern Recognition, vol. 3 pp. 815-818.*

X. Shen et al., "Error Propagation from Camera Motion to Epipolar Constraint," Proceedings of the British Machine Vision Conference, pp. 546-555 (Sep. 11, 2000).

* cited by examiner

*Primary Examiner* — Bhavesh Mehta
*Assistant Examiner* — Barry Drennan
(74) *Attorney, Agent, or Firm* — Finnegan, Henderson, Farabow, Garrett & Dunner, L.L.P.

(57) ABSTRACT

In a stereo vision system comprising two cameras shooting the same scene from different positions, a method is performed for determining dense disparity fields between digital images shot by the two cameras, including the steps of capturing a first and a second image of the scene, and determining, for each pixel of the second image, the displacement from a point in the first image to such pixel of the second image minimizing an optical flow objective function, wherein the optical flow objective function includes, for each pixel of the second image, a term depending in a monotonously increasing way on the distance between the epipolar line associated with such pixel and the above point in the first image, such term depending on calibration parameters of the two cameras and being weighed depending on the uncertainty of the calibration data.

12 Claims, 2 Drawing Sheets

METHOD FOR DETERMINING DENSE DISPARITY FIELDS IN STEREO VISION

CROSS REFERENCE TO RELATED APPLICATION

This application is a national phase application based on PCT/IB2005/003840, filed Dec. 21, 2005, the content of which is incorporated herein by reference.

TECHNICAL FIELD

The present invention deals, in general, with a method for automatically analysing stereo vision images, in particular a method for determining dense disparity fields when the epipolar geometry is known.

A frequent problem to be solved when automatically analysing images is determining the disparity that describes the difference existing between two frames showing the same scene, acquired from different points of view with one or more cameras. The disparity represents the difference in position of the same scene element in the two frames. There are algorithms which compute the disparity for every image pixel, and there are other ones which are limited to a subset thereof, namely to a group of relevant features. In the former case, these are called dense disparity fields, in the latter case these are called sparse disparity fields. The present invention pertains to the first category.

A known technique for comparing two images and determining the correspondence between pixels contained therein is the optical flow technique. The prior art provides for versions of such technique which perform the computation by taking into account the video-camera calibration parameters.

US2003/0086590 discloses, for example a technique for computing the optical flow by taking into account the so-called epipolar constraint, which presumes applying the optical flow twice: a first time in a "sparse" way (namely only for a set of image pixels), in order to identify the movement of some points with high information content and consequently compute a fundamental matrix for the epipolar geometry, and a second time in a "dense" way by using an epipolar constraint derived from such fundamental matrix. In practice, the individual epipolar lines, used in the second step, are obtained from the fundamental matrix and are identified by equation:

$$a_{x,y}(x-u_{x,y})+b_{x,y}(y-v_{x,y})+c_{x,y}=0,$$

where $a_{x,y}$, $b_{x,y}$ and $c_{x,y}$ denote coefficients related to the epipolar line computed at the point (x,y), and $u_{x,y}$ and $v_{x,y}$ denote the amount of movement for the point in consideration. Such equation is a constraint for the solution to the well known optical flow equation:

$$I_x u + I_y v + I_t = 0$$

where $I_x$, $I_y$ and $I_t$ denote the space-time derivatives of the image intensity in the considered point. In this way, the movement points to positions lying on epipolar lines.

U.S. Ser. No. 05/764,871 discloses a method for synthesizing intermediate images in stereo vision. The intermediate point of view is computed using the optical flow technique. However, the movement is constrained to be purely a translational movement along the horizontal direction, consequently obtaining parallel epipolar lines. To avoid loss of generality, the optical flow computation is preceded by a procedure of vertical alignment of the acquired frames.

BRIEF DESCRIPTION OF THE INVENTION

The Applicant observed that the techniques described in previously cited documents do have problems, even though the introduction of constraints imposed by epipolar geometry in the optical flow technique allows improving the computation of disparity fields between two images.

In particular, such techniques constrain the solution of the optical flow equations to lie on the epipolar line. Such an imposition, in case of errors in computing the epipolar lines, typically due to camera calibration inaccuracies, makes the computed solution not optimal with respect to the shot scene. An estimation constrained to the epipolar line therefore can provide an unacceptable solution, above all when contours and strong discontinuities are present in the frame.

The Applicant found that it is possible to improve the quality of the extracted disparity field, if one assigns a variable influence to the camera calibration, rather than taking into account the calibration as an absolute constraint, since it is possible to affect the process at will in order to compensate for system calibration errors. This is obtained by adding a new term to the function to be minimised in order to solve the optical flow problem. The additional term in such modified optical flow objective function is related to the geometry associated with the camera configuration.

In practice, after having captured two images of the same scene, taking into account that for each pixel of the second image there is a corresponding point (not necessarily a pixel) in the first image (if the pixel is related to an element of the scene also captured in the first image), the method of the invention allows computing the disparity field between the two images, namely the set of displacements from points in the first image to the related pixels in the second image, by determining movements which minimise an optical flow objective function that comprises a term which takes into account the epipolar constraint. In particular, for every pixel of the second image, such term depends on the distance between the corresponding point in the first image and the epipolar line associated with such pixel. In more detail, such term is proportional to the square of the distance between such point and such line. According to a first aspect thereof, the present invention is therefore related to a method for determining dense disparity fields among digital images, comprising the steps of:

capturing a first and a second image of a same scene, from two different positions related to the same scene; and determining, for each pixel of the second image, the movement from a point in the first image to such pixel of the second image minimising an optical flow objective function;

wherein the optical flow objective function comprises, for each pixel of the second image, a term depending in a monotonously increasing way on the distance between the epipolar line associated with such pixel and the above point of the first image.

Preferably, the first and the second image are captured through a first and a second camera, respectively, and the above term depends on the calibration parameters of the two cameras. Alternatively, the first and the second image can be captured by a single camera that moves with respect to the scene to be shot, for example mounted on a platform that rotates around the scene itself.

The above term can be weighed depending on the uncertainty of the camera calibration data.

Moreover, the above term is preferably proportional to the square of the distance between the epipolar line associated with the above pixel of the second image and the above point in the first image.

The displacement which minimises the optical flow objective function can possibly represent a residual displacement component; in that case, the method comprises, before determining such residual displacement component, the step of determining a previous displacement component to which the residual component must be added.

The previous displacement component can be determined through the steps of:
identifying features in the first image;
determining the displacement of such features onto the second image;
interpolating the displacement of such relevant spots onto the second image.

Alternatively, the previous displacement component can be determined by minimising at least once the above optical flow objective function. The method can therefore comprise an iterative process for minimising such objective function.

According to another possible alternative, the first and the second image can comprise at least one version with lower resolution and a version with greater resolution; in that case the step of determining the previous displacement component comprises minimising the optical flow objective function for the version with lower resolution, and determining the residual displacement component comprises minimising the optical flow objective function for the version with greater resolution.

Preferably, the optical flow objective function comprises a first term obtained through a Taylor expansion of a brightness change constraint equation for the two images (BCCE).

Moreover, the optical flow objective function preferably comprises a second term obtained by imposing that the second derivatives of spatial components of the above displacement are next to zero.

The technique of the present invention can be used for example for synthesizing intermediate images in stereo vision.

The present invention further relates to a stereo vision system, comprising at least one camera, preferably two, adapted to shoot at least two images from two different positions, and a processing unit adapted to receive the two images, such processing unit being configured for processing such images according to the previously described method.

BRIEF DESCRIPTION OF THE FIGURES

The present invention will be described below with reference to the enclosed figures, which show a non-limiting embodiment thereof. In particular.

DETAILED DESCRIPTION OF THE INVENTION

Figure 1:
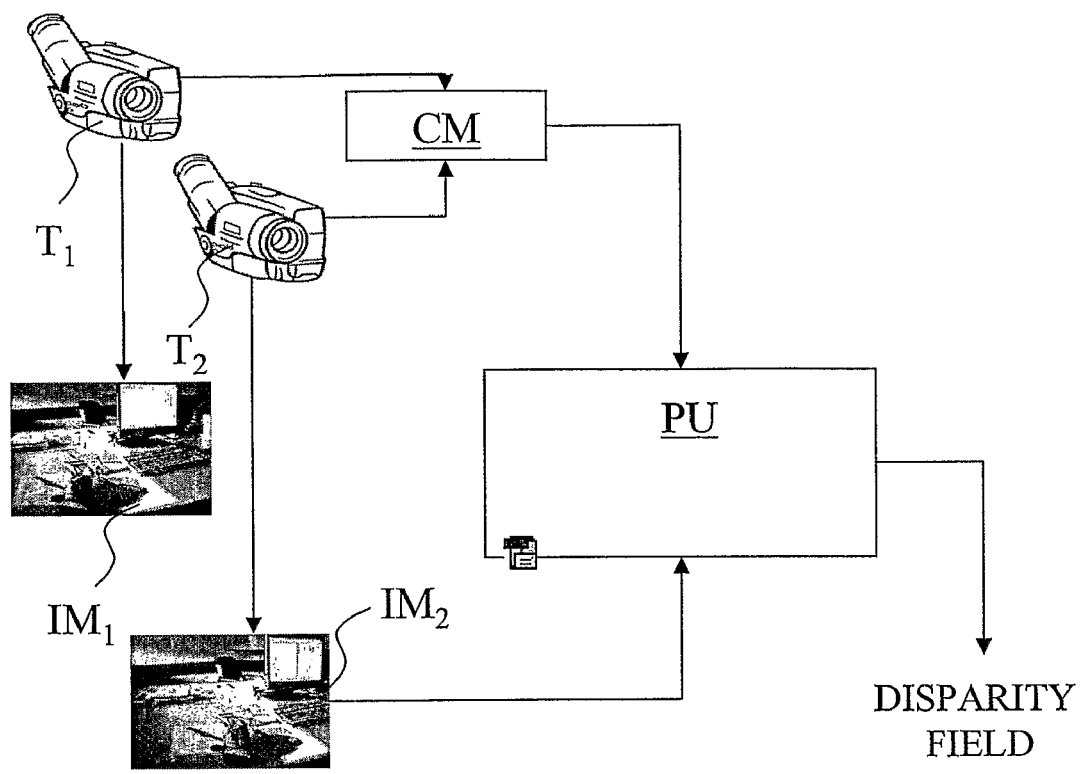
FIG. 1 schematically shows a video capture system comprising two cameras and blocks composing the process described in the invention.

With reference to FIG. 1, S denotes, as a whole, a video capture system with several cameras. In particular, the system S is adapted for shooting from different positions of a same scene and for determining dense disparity fields between the images thereby acquired.

The system S comprises a first camera $T_1$ and a second camera $T_2$, adapted to generate respective digital images (or frames) $IM_1$, $IM_2$ of a same scene. The two cameras $T_1$, $T_2$ may be oriented towards the scene as mutually parallel or mutually inclined.

The system S further comprises a processing unit PU, connected to both cameras $T_1$, $T_2$, and adapted to process digital images $IM_1$ and $IM_2$ received from the two cameras $T_1$, $T_2$ in order to obtain a dense disparity field according to the method described below. Moreover, the system comprises a camera calibration module CM, preferably a software module being present in the processing unit PU, or in a separate unit (as in the example of FIG. 1), adapted to provide the processing unit PU with calibration data to be used for processing according to the method of the invention.

In a video sequence, consecutive frames are often similar, even though they often differ due to the movement of some objects of the scene or of the camera. In these cases, a frame can be deformed to approximate the one in the preceding or following instant. This observation is the base of motion estimation techniques.

The same observation is valid for a pair of frames showing the same scene and shot simultaneously. The condition for the two frames to be similar is that the two cameras are placed sufficiently near one to the other and that they view the same portion of the scene.

Taking again into account the case of subsequent frames belonging to the same video sequence, the well known constraint equation on the image brightness change ("brightness change constraint equation", BCCE) presumes that two consecutive frames in the sequence, in the following denoted by $g_t$ and $g_{t+\delta t}$, differ due to a spatial distortion. In other words, it is possible to identify "motion fields" u and v adapted to transform the coordinates in the following way:

$$g(x,y,t+\delta t)=g(x-u(x,y),y-v(x,y),t). \tag{1}$$

The same equation can be used for simultaneously acquired frames from two cameras arranged in different positions, instead of for subsequent frames in time, shot by a single camera. In such a case, the BCCE refers to frames $g_1$, $g_2$ and becomes:

$$g_2(x,y)=g_1(x-u(x,y),y-v(x,y)). \tag{2}$$

In that context, the motion field is also called "disparity field". According to the BCCE, the change between the two frames occurs as if the starting frame $g_1$ were impressed on a deformable elastic cloth. It is therefore not contemplated that image elements appear and disappear, nor are lighting changes foreseen. Consequently, the BCCE is an approximation that does not have absolute validity. In spite of this, these equations are fundamental for several disparity estimation techniques. For example, when disparity fields u and v are constant within square or rectangular areas, one has the "block matching" case which is a widely used technique in the field of video coding.

By linearising a Taylor expansion of BCCE equation (1), the following is obtained $$g_x u + g_y v = -g_t, \tag{3}$$

where $g_x$, $g_y$, $g_t$ are partial derivatives with respect to x, y and t, respectively. In the practical case of discrete images, the partial derivatives $g_x$, $g_y$ are computed depending on brightness differences in adjacent pixels, while the time derivative can be approximated with the difference $g_t = g_2 - g_1$.

An equation (3) is defined for every pixel of the frame. It is possible to order the set of frame pixels in a column vector, for example by vertically stacking the individual columns composing it. In such a way, it is possible to order the set of equations (3) in a matrix form, placing in column vectors both partial derivatives $\vec{g}_x$, $\vec{g}_y$, $\vec{g}_t$, and unknown disparity field values $\vec{u}$ and $\vec{v}$. The equations for linear BCCE terms thereby become $$[\mathrm{diag}(\vec{g}_x)\ \mathrm{diag}(\vec{g}_y)]\begin{bmatrix}\vec{u}\\\vec{v}\end{bmatrix}=-\vec{g}_t. \tag{4}$$

In such expression, operator diag(•) transforms a vector (frame) into a matrix with the vector elements (frame pixels) on the diagonal. The other matrix elements are equal to zero.

If, for brevity, the matrix containing the two diagonal lines is denoted by the symbol G, the following equation is obtained:

$$G\begin{bmatrix}\vec{u}\\\vec{v}\end{bmatrix} = -\vec{g}_t \quad (5)$$

whose solution is the disparity field $$\vec{p} = \begin{bmatrix}\vec{u}\\\vec{v}\end{bmatrix}$$

which minimises a norm, expressed as:

$$\vec{p} = \operatorname{argmin}_{u,v}\left\|G\begin{bmatrix}\vec{u}\\\vec{v}\end{bmatrix} + \vec{g}_t\right\|^2. \quad (6)$$

This problem, expressed by equation (6), is under-determined and the classical remedy is performing a regularization by imposing that disparity fields u and v have their second derivatives next to zero. In order to do so, the following equations are added:

$u_x^2 = 0$ $u_y^2 = 0$ $v_x^2 = 0$ $v_y^2 = 0 \quad (7)$ where $u_x^2$, $u_y^2$, $v_x^2$, $v_y^2$ denote the second spatial derivatives of the two disparity fields. Such second derivatives can be expressed as matrices which realise (or approximate) them:

$$D_x 3 = \frac{\partial^2}{\partial x^2},$$

$$D_y 2 = \frac{\partial^2}{\partial y^2}.$$

If, again for brevity, the following substitution is made:

$$H = \begin{bmatrix}D_{x^2} & & & \\ D_{y^2} & & & \\ & & D_{x^2} & \\ & & & D_{y^2}\end{bmatrix}$$

then criterion (7) of second derivatives next to zero is expressed as:

$$H\begin{bmatrix}\vec{u}\\\vec{v}\end{bmatrix} = 0. \quad (8)$$

The solution of equation (8) satisfies the condition:

$$\vec{p} = \operatorname{argmin}_{u,v}\left\|H\begin{bmatrix}\vec{u}\\\vec{v}\end{bmatrix}\right\|^2 \quad (9)$$

The criterion expressed by equation (9) can be combined, by summing it, with the one expressed by equation (6) (deriving from the BCCE). It is possible to associate a relative importance to the term in equation (9) with respect to the term in equation (6), multiplying the operator H by a factor λ, called regularization factor. In this way, the disparity fields are given by the solution of the equation:

$$\begin{bmatrix}\vec{u}\\\vec{v}\end{bmatrix} = \operatorname{argmin}_{u,v}\left\{\left\|G\begin{bmatrix}\vec{u}\\\vec{v}\end{bmatrix} + \vec{g}_t\right\|^2 + \lambda^2\left\|H\begin{bmatrix}\vec{u}\\\vec{v}\end{bmatrix}\right\|^2\right\}. \quad (10)$$

The function to be minimised in equation (10) is the optical flow objective function.

It is necessary to note that the parameter λ must be determined beforehand. There are several heuristic methods for this purpose. A simple method consists in varying the value in some tests, determining a set of values which ensures a good result and which guarantees a unique solution. This is possible due to the solution stability with respect to variations of the parameter λ.

The solution of equation (10) can be found by solving a system of linear equations, obtained by ordering equations (6) and (9) in the optical flow system:

$$\begin{bmatrix}G\\\lambda H\end{bmatrix}\begin{bmatrix}\vec{u}\\\vec{v}\end{bmatrix} = \begin{bmatrix}-\vec{g}_t\\0\end{bmatrix}. \quad (11)$$

This system is over-determined and generally it can be solved with a least squares approximation. The solution is given by:

$$\begin{bmatrix}\vec{u}\\\vec{v}\end{bmatrix} = -(G^T G + \lambda^2 H^T H)^{-1} G^T \vec{g}_t. \quad (12)$$

By taking into account a shooting of a same scene by two cameras, the relationship between the thereby shot frames is expressed through the epipolar geometry. Every scene element that is visible in both shots is projected in the two frames with positions complying with a simple equation. The coefficients of such equation are contained in the so-called fundamental matrix F, composed of 3×3 elements. The fundamental matrix describes the relationship existing, in terms of epipolar geometry, between two images related to the same scene, taking into account the parameters describing the vision system (namely camera characteristics and positions). It can be computed through a camera calibration process. The same element of the scene is projected on the frames in two pixels that can be represented in homogeneous coordinates in the following way:

$$m_1 = \begin{bmatrix}x_1\\y_1\\1\end{bmatrix} \text{ and } m_2 = \begin{bmatrix}x_2\\y_2\\1\end{bmatrix}.$$

Such coordinates must comply with the equation:

$m_2^T F m_1 = 0. \quad (13)$

Therefore, given a pixel $m_1$ in the first of the two frames, the pixel $m_2$ in the second frame must reside on a straight line whose coefficients are determined by product $Fm_1$. Symmetrically, given a pixel $m_2$ in the second frame, the pixel $m_1$ must reside on the line with coefficients contained in product $m_2^T F$. These lines are called epipolar and the above relationship is an expression of the epipolar geometry, which is completely represented by fundamental matrix F.

The technique described below allows computing the disparity field, which describes the difference existing between two shots of the same scene, exploiting the epipolar geometry, thereby improving the accuracy that can be obtained. However, since the fundamental matrix can be affected by estimation errors, it may be incorrect to use information contained therein as an absolute constraint, and the technique of the present invention therefore uses the fundamental matrix in a relative way, associating a cost to the deviation from the epipolar geometry represented thereby.

The present invention'allows in particular to obtain a cost term from the epipolar information. Such term is joined by other traditional optical flow terms (expressed in equation (10)), thereby modifying the objective function. Since the influence of every term can be set through a regularization factor, the requirement of a relative value associated to the fundamental matrix is satisfied.

In practice, the technique of the present invention allows giving penalties to deviations from the epipolar geometry, without however forbidding such deviations. For this purpose, the expression of the distance of a pixel from a straight line must be taken into account. A straight line can be parameterized through a vector $$l = \begin{bmatrix} a \\ b \\ c \end{bmatrix}$$

such that any point $m = [x\ y\ 1]^T$ on the straight line complies with the equation:

$$l^T m = ax + by + c = 0. \tag{14}$$

Consequently, the straight line is composed of the set:

$$L = \{m : l^T m = 0\}. \tag{15}$$

The distance of a generic point $w = [x'\ y'\ 1]^T$ from the straight line is equal to:

$$\rho(w, L) = \frac{ax' + by' + c}{\sqrt{a^2 + b^2}}. \tag{16}$$

As already stated, the disparity estimation allows finding correspondences between points in two frames. The classic optical flow equation provides a criterion that can be easily minimised, for comparing the immediate neighbourhoods of two points and for keeping the disparity field smooth. The epipolar geometry supplies an additional information that can be added as a supplement to the optical flow objective function.

Typically, every pixel with homogeneous coordinates $z_2 = [x_2\ y_2\ 1]^T$ has to be associated with the pixel (or more generally, the point) $z_1 = [x_1\ y_1\ 1]^T$ in the first frame, which best satisfies the objective function. Such an association implies a disparity vector $d = z_2 - z_1$, whose two components are u and v.

The main concern here regards the distance of pixel $z_1$, expressed as $z_1 = z_2 - d$, from the epipolar line associated with pixel $z_2$.

The coefficients that represent the epipolar line in the frame containing $z_1$ are $$[abc] = z_2^T F.$$

Considering equation (16), the distance of spot $z_2 - d$ from the epipolar line can be expressed as:

$$\rho(z_2 - d, L) = \frac{a(x_2 - u) + b(y_2 - v) + c}{\sqrt{a^2 + b^2}}, \tag{17}$$

where $$z_2 = \begin{bmatrix} x_2 \\ y_2 \\ 1 \end{bmatrix}$$

is the starting point, $$d = \begin{bmatrix} u \\ v \\ 0 \end{bmatrix}$$

is the disparity vector, and $$[abc] = z_2^T F$$

are the coefficients of the epipolar line.

The distance between $z_2 - d$ and the epipolar line will be called epipolar error.

In order to insert the epipolar error in a regularization term in the optical flow equation, it is necessary to express the error in all pixels as a linear function of the disparity fields. Taking into account that all variables in expression (17) are functions of the coordinates x,y, the following is obtained:

$$\rho(z(x, y) - d(x, y), L(x, y)) = \frac{a(x, y) \cdot (x - u(x, y)) + b(x, y) \cdot (y - v(x, y)) + c(x, y)}{\sqrt{a(x, y)^2 + b(x, y)^2}} \tag{18}$$

The disparity fields u, v can be ordered into column vectors as already done for optical flow equations. The remaining coefficients can be ordered in the same way, as:

$$\vec{p} = \begin{bmatrix} \vdots \\ \dfrac{a(x, y)}{\sqrt{a(x, y)^2 + b(x, y)^2}} \\ \vdots \end{bmatrix},$$

$$\vec{q} = \begin{bmatrix} \vdots \\ \dfrac{b(x, y)}{\sqrt{a(x, y)^2 + b(x, y)^2}} \\ \vdots \end{bmatrix},$$

and $$\vec{r} = \begin{bmatrix} \vdots \\ \dfrac{a(x, y)x + b(x, y)y}{\sqrt{a(x, y)^2 + b(x, y)^2}} \\ \vdots \end{bmatrix},$$

in which every element corresponds to a pixel with a unique pair of coordinates x, y.

In this way, the vector containing the epipolar errors for all pixels becomes $$\left[\rho(z(x,y) - d(x,y), L(x,y))\right] = \vec{r} - [\text{diag}(\vec{p})\ \text{diag}(\vec{q})]\begin{bmatrix}\vec{u}\\\vec{v}\end{bmatrix} \quad (19)$$

By referring to the matrix of the two diagonals as $$E = [\text{diag}(\vec{p})\text{diag}(\vec{q})],$$

it is possible to rewrite the right hand part of equation (19) as $$\vec{r} - E\begin{bmatrix}\vec{u}\\\vec{v}\end{bmatrix}$$

The norm of this vector provides a measure of the epipolar error obtained by applying the disparity field. In the present invention, the square of this norm is added to the optical flow objective function expressed by equation (10), thereby obtaining:

$$\begin{bmatrix}\vec{u}\\\vec{v}\end{bmatrix} = \text{argmin}_{u,v}\left\{\left\|G\begin{bmatrix}\vec{u}\\\vec{v}\end{bmatrix} + \vec{g}_t\right\|^2 + \lambda^2\left\|H\begin{bmatrix}\vec{u}\\\vec{v}\end{bmatrix}\right\|^2 + \mu^2\left\|E\begin{bmatrix}\vec{u}\\\vec{v}\end{bmatrix} - \vec{r}\right\|^2\right\}. \quad (20)$$

The factor $\mu$ determines the relative weight of the epipolar error in the objective function. As in the case of the other regularization factor $\lambda$, also $\mu$ must be established beforehand. This factor can be determined heuristically, also depending on the reliability assigned to the fundamental matrix. The newly introduced third term of the sum is proportional to the square of the distance between the relevant point and the epipolar line, and thereby increases monotonously with such distance.

In order to solve the minimization problem, the coefficients are ordered in the system $$\begin{bmatrix}G\\\lambda H\\\mu E\end{bmatrix}\begin{bmatrix}\vec{u}\\\vec{v}\end{bmatrix} = \begin{bmatrix}-\vec{g}_t\\0\\\mu\vec{r}\end{bmatrix}, \quad (21)$$

since the norm $$\left\|\begin{bmatrix}G\\\lambda H\\\mu E\end{bmatrix}\begin{bmatrix}\vec{u}\\\vec{v}\end{bmatrix} - \begin{bmatrix}-\vec{g}_t\\0\\\mu\vec{r}\end{bmatrix}\right\|^2$$

is identical to the objective function minimised in equation (20). The solution (best approximation) of the optical flow equation modified according to the present invention is given by:

$$\begin{bmatrix}\vec{u}\\\vec{v}\end{bmatrix} = (G^T G + \lambda^2 H^T H + \mu^2 E^T E)^{-1}(\mu^2 E^T \vec{r} - G^T \vec{g}_t). \quad (22)$$

The above modified optical flow technique can be applied in any context in which the optical flow is used and where information about the epipolar geometry are available. Consequently, the technique of the present invention can be used also in processes aimed at improving the results that can be obtained with the optical flow, such as for example the processes known as "optical flow initialisation", "iterative solution" and "multi-resolution".

In all listed processes the optical flow is applied starting from a previous solution, which is in fact a disparity field that has to be improved.

In the case of initialisation, one exploits a disparity field produced with methods different from the optical flow. Among the known methods, there is the determination of sparse disparity fields, namely the identification of feature points and their tracking between frames, as disclosed for example in patent application 05WO-IB003598 of the same Applicant. Through interpolation, from the movement of tracked points, it is possible to construct a dense field, namely a field defined for every pixel. Such a field is a coarse approximation of the optimum disparity, and allows reducing the excursion of the disparity that remains to be determined with the optical flow. The optical flow is therefore initialised by such a dense field to obtain the final disparity field.

In the case of an iterative solution, the disparity field generated by the optical flow is used as an initialisation field of a subsequent optical flow application. This process can be repeated many times until an interruption criterion is satisfied, for example when the incremental field determined in the last iteration has an energy below a given threshold.

Finally, in the case of multi-resolution, the optical flow is applied hierarchically to reduced versions of the frames, starting from the smallest size, as disclosed for example in patent application 05WO-IB002920 of the same Applicant. The disparity field estimated at one resolution is suitably upscaled and applied for initialising the computation at a higher resolution.

In each one of the three described cases, the resulting field can be expressed as a sum of two fields. The first term is the previously determined field, while the second one is the residual which has to be computed. In other words, for every pixel (of the second image) there is a previous disparity component, obtained with one of the three above techniques, and a residual disparity component, obtained by minimising the optical flow objective function as described in equation (22), however suitably adapted through the modifications described below.

The previously determined field can be denoted by $$\begin{bmatrix}\vec{u}_{pred}\\\vec{v}_{pred}\end{bmatrix},$$

and the residual, to be computed through the optical flow, can be denoted by $$\begin{bmatrix}\vec{\delta u}\\\vec{\delta v}\end{bmatrix}.$$

The result can then be expressed as their sum $$\begin{bmatrix}\vec{u}\\\vec{v}\end{bmatrix} = \begin{bmatrix}\vec{u}_{pred}\\\vec{v}_{pred}\end{bmatrix} + \begin{bmatrix}\vec{\delta u}\\\vec{\delta v}\end{bmatrix}. \quad (23)$$

By inserting the thereby decomposed disparity field in formula (17) for the epipolar error, for the individual pixel the following is obtained $$\rho(z_2 - d, L) = \frac{a(x_2 - u_{pred} - \delta u) + b(y_2 - v_{pred} - \delta v) + c}{\sqrt{a^2 + b^2}}. \quad (24)$$

This implies a modification of the vector $\vec{r}$, which becomes $$\vec{r} = \begin{bmatrix} \vdots \\ \frac{a(x,y)(x - u_{pred}(x,y)) + b(x,y)(y - v_{pred}(x,y))}{\sqrt{a(x,y)^2 + b(x,y)^2}} \\ \vdots \end{bmatrix}$$

and a modification of the vector $\vec{g}_t$, which becomes the difference between frame $g_2$ and starting frame $g_1$ modified by applying the previously determined field $\vec{u}_{pred}$, $\vec{v}_{pred}$ using an image deformation operator M $$M(g, \vec{u}, \vec{v})(x,y) = g(x - u(x,y), y - v(x,y)),$$

such that $$g_t = g_2 - M(g_1, \vec{u}_{pred}, \vec{v}_{pred}). \quad (25)$$

The operator M can be realised through bi-linear, bi-cubic or other interpolations, using suitable rules for pixels for which coordinates (x−u(x,y), y−v(x,y)) should fall outside the frame. In this case, for example, the operator can provide the colour of the pixel that is nearest to the specified coordinates and belonging to the image.

Minimization of the objective function thereby produces the residual $$\begin{bmatrix} \vec{\delta u} \\ \vec{\delta v} \end{bmatrix} = (G^T G + \lambda^2 H^T H + \mu^2 E^T E)^{-1} (\mu^2 E^T \vec{r} - G^T \vec{g}_t). \quad (26)$$

In case of multi-resolution computation, it is further necessary to adapt the fundamental matrix to the different image sizes. Should the size be altered with a multiplying factor s, the fundamental matrix must be modified in the following way:

$$F(s) = \begin{bmatrix} s^2 F_{11} & s^2 F_{12} & s F_{13} \\ s^2 F_{21} & s^2 F_{22} & s F_{23} \\ s F_{31} & s F_{32} & F_{33} \end{bmatrix}, \quad (27)$$

and the coefficients a, b, c, used in the regularization term, are consequently modified.

Figure 2:
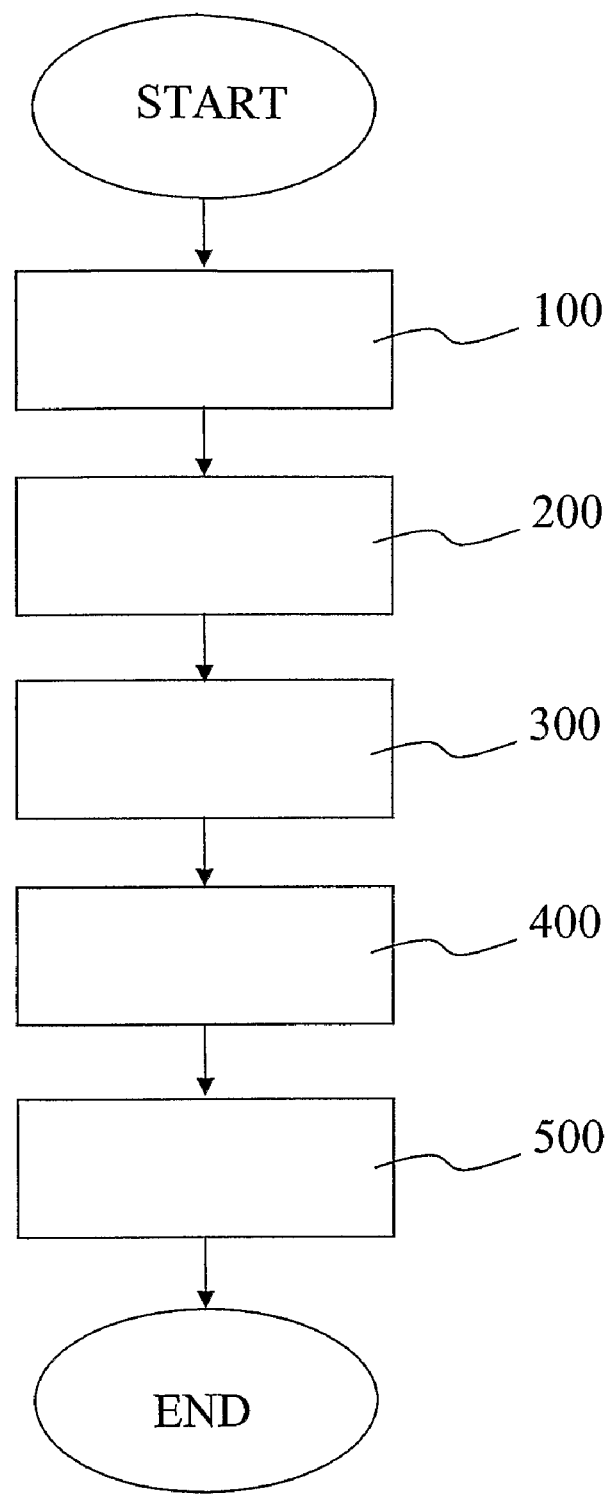
FIG. 2 schematically shows the processing flow performed for obtaining the disparity fields according to the method of the invention.

The sequence of steps for computing the disparity field will be summarised below with reference to the flow chart in FIG. 2. The newly described general case will be taken into account, in which the modified optical flow technique of the present invention is applied to a previous solution obtained with a different technique, or with the same iterated optical flow technique (the individual application of a modified optical flow technique being a trivial case of such a general technique, since it coincides with the initialisation of a null disparity field).

The process starts (step 100) by acquiring the two simultaneous frames $g_1$ and $g_2$ through the cameras $T_1$ and $T_2$, by computing the fundamental matrix F depending on the calibration parameters for cameras $T_1$ and $T_2$, and by determining (or acquiring) the previous disparity field $$\begin{bmatrix} \vec{u}_{pred} \\ \vec{v}_{pred} \end{bmatrix}.$$

Calibration parameters (intrinsic ones, like focal length and projection centre, and extrinsic ones, like the rotation-translation matrix) are computed beforehand in a calibration process for the cameras $T_1$, $T_2$.

The deformation of the starting frame $g_1$ is then determined (step 200) by applying the field $\vec{u}_{pred}$, $\vec{v}_{pred}$ and the operator M.

The process then provides (step 300) for the computation of the residual disparity field $$\begin{bmatrix} \vec{\delta u} \\ \vec{\delta v} \end{bmatrix}$$

according to equation (26).

The two components of the previous disparity field and the residual disparity field are then summed (step 400) in order to obtain the total disparity field $$\begin{bmatrix} \vec{u} \\ \vec{v} \end{bmatrix}$$

as output (step 500).

The invention claimed is:

1. A method for determining dense disparity fields between digital images, comprising the steps of:
   capturing a first and a second image of a same scene, said first and second images being captured from two different positions related to said scene; and
   determining, for each pixel of the second image, a disparity from a point in the first image to said pixel of the second image minimising an optical flow objective function,
   the optical flow objective function comprising, for each one of said pixels of the second image, a term depending in a monotonically increasing way on a distance between an epipolar line associated with said pixel and said point of the first image.

2. The method according to claim 1, wherein said first and second images are captured through a first and a second camera, respectively, and said term depends on the calibration parameters of said first and second cameras.

3. The method according to claim 2, wherein said term is weighed depending on the uncertainty of the camera calibration data.

4. The method according to claim 1, wherein said term is proportional to the square of the distance between the epipolar line associated with said pixel and said point of the first image.

5. The method according to claim 4, wherein determining said previous disparity component comprises the steps of:

identifying feature points on the first image;

determining a displacement of said feature points onto the second image; and interpolating the displacement of said feature points onto the second image.

6. The method according to claim 1, wherein said disparity which minimises an optical flow objective function, represents a residual disparity component, and the method comprises, before determining said residual disparity component, the step of determining a previous disparity component to which said residual component is added.

7. The method according to claim 6, wherein determining said previous disparity component comprises minimising at least once said optical flow objective function.

8. The method according to claim 6, wherein said first and second images comprise at least one version with lower resolution and one version with higher resolution, and wherein determining said previous disparity component, comprises minimising said optical flow objective function for said version with lower resolution, and determining said residual disparity component, comprises minimising said optical flow objective function for said version with higher resolution.

9. The method according to claim 1, wherein the optical flow objective function comprises a first term obtained through a Taylor expansion of a brightness change constraint equation.

10. The method according to claim 1, wherein the optical flow objective function comprises a second term obtained by imposing that second derivatives of spatial components of said disparity be next to zero.

11. A stereo vision system, comprising at least one camera adapted to shoot at least two images from two different positions of a same scene, and a processing unit adapted to receive the two images, wherein said processing unit is configured to perform the steps of:

capturing a first and a second image of a same scene, said first and second images being captured from two different positions related to said scene; and determining, for each pixel of the second image, a disparity from a point in the first image to said pixel of the second image minimizing an optical flow objective function, the optical flow objective function comprising, for each one of said pixels of the second image, a term depending in a monotonically increasing way on a distance between an epipolar line associated with said pixel and said point of the first image.

12. The system according to claim 11, comprising two cameras arranged in different positions.

* * * * *